United States Patent [19]

Meyer, Jr.

[11] Patent Number: 4,878,651
[45] Date of Patent: Nov. 7, 1989

[54] VALVE SEAT ASSEMBLY
[75] Inventor: Frank W. Meyer, Jr., Montgomery, Tex.
[73] Assignee: Worldwide Oilfield Machine, Inc., Houston, Tex.
[21] Appl. No.: 338,504
[22] Filed: Apr. 14, 1989

Related U.S. Application Data

[63] Continuation of Ser. No. 172,436, Mar. 24, 1988, abandoned.

[51] Int. Cl.$^4$ ............................................. F16K 1/42
[52] U.S. Cl. ...................................... 251/172; 251/328
[58] Field of Search ..................... 251/171, 172, 328

[56] References Cited

U.S. PATENT DOCUMENTS

| | | | |
|---|---|---|---|
| 3,110,470 | 11/1963 | Dumm | 251/172 X |
| 3,305,213 | 2/1967 | Grove | 251/172 X |
| 3,446,476 | 5/1969 | Scaramucci | 251/172 |
| 3,834,664 | 9/1974 | Atkinson | 251/172 X |
| 4,083,376 | 4/1978 | Alaniz | 251/172 X |
| 4,226,258 | 10/1980 | Nakanishi | 251/172 X |
| 4,434,967 | 3/1984 | Vanderburg | 251/172 X |

Primary Examiner—John Fox
Attorney, Agent, or Firm—Dodge, Bush & Moseley

[57] ABSTRACT

A through conduit gate valve apparatus having a valve seat assembly that is field maintainable and which prevents the occurrence of pressure lock is disclosed. Each valve seat assembly includes a retainer ring fixed in the valve body and a pressure responsive seat ring that seals with the gate member. The seat ring is responsive to fluid pressure in the valve flow passageways for maintaining and enhancing the face seal with the gate and to fluid pressure in the valve chamber for automatically venting the valve chamber to prevent occurrence of a pressure lock condition.

3 Claims, 2 Drawing Sheets

VALVE SEAT ASSEMBLY

This application is a continuation of application Ser. No. 172,436 filed Mar. 24, 1988, now abandoned.

BACKGROUND OF THE INVENTION

1. Field of the Invention

The field of the present invention relates generally to valves having seat assemblies and more particularly to a gate valve having pressure responsive seat assemblies.

2. Background

Gate valves are well known for use in controlling flow of fluids. Generally, gate valves are formed by a valve body having a removable bonnet portion and forming inlet and outlet flow passageways connected by an enlarged central chamber. Movably disposed in the enlarged valve chamber is a gate flow closure member that is reciprocated between open and closed positions. A rotatable stem means, normally mounted with and protruding through the valve bonnet, is operably connected to the gate member to effect the desired reciprocating movement. When moved to the closed position, the gate sealingly engages annular seat rings carried by the valve body to block flow of fluid between the flow passageways. When the gate is reciprocated to the open position, the gate is moved from adjacent the seats into the valve chamber for enabling fluid communication between flow passageways through the valve chamber.

One known type of gate valve is the through conduit version. In this type of gate valve the parallel sealing faces of the movable gate flow closure slab or member continuously seal with annular seats carried by the valve body in both the open and closed positions. The parallel sided gate is provided with a flow opening or port that is aligned with the valve flow passageways when in the open position. Because of this construction a straight through flow path or conduit, free of fluid turbulence in the valve chamber, is formed internally of the gate valve which produces the common name used to designate or identify a through conduit type gate valve.

Gate valves are susceptible to a condition known in the trade or art as "pressure-lock" of which through conduit construction are vulnerable in both the open or closed position. Fluid pressure leakage past the valve seats can be trapped in the valve chamber with the result that gate member is pressure locked against operating movement. To return the valve to normal operation, the valve chamber fluid pressure must be vented. This condition may also occur in other forms or types of gate valves.

SUMMARY OF THE INVENTION

The present invention pertains to valves and seat assemblies for use in valves and particularly a seal assembly for through conduit gate valves that automatically vents fluid pressure in the valve chamber back into the fluid passageways to prevent pressure lock. Each seat assembly includes a first seat ring member and a second seat ring member that are arranged in a concentric sealed manner that provides for limited axial movement therebetween. The first or outer seat ring is secured and sealed to the valve body in a seat pocket surrounding a flow passageway. The second or inner seal ring forms a face seal with the movable conduit gate and a plurality of pressure responsive surfaces that shift the second seal ring relative to the first seal ring. A first annular pressure responsive surface formed on the second seal member urges the second seal member to move axially into sealing contact with the gate member in response to fluid pressure in the flow passage. A second pressure responsive surface formed on said second seat member moves the second seat member from sealing contact with the movable gate member in response to fluid pressure in the valve chamber for venting the chamber and automatically preventing the occurrence of "pressure lock". By controlling the seal diameters on the second seal member the pressure responsive urging can be controlled to achieve the desired operating features.

An object of the present invention is to provide a new and improved valve apparatus.

Another object of the present invention is to provide a new and improved valve apparatus that is automatically vented to prevent the occurrence of a pressure lock condition.

A further object is to provide a new and improved valve seat apparatus.

DESCRIPTION OF THE PREFERRED EMBODIMENT

Figure 1:
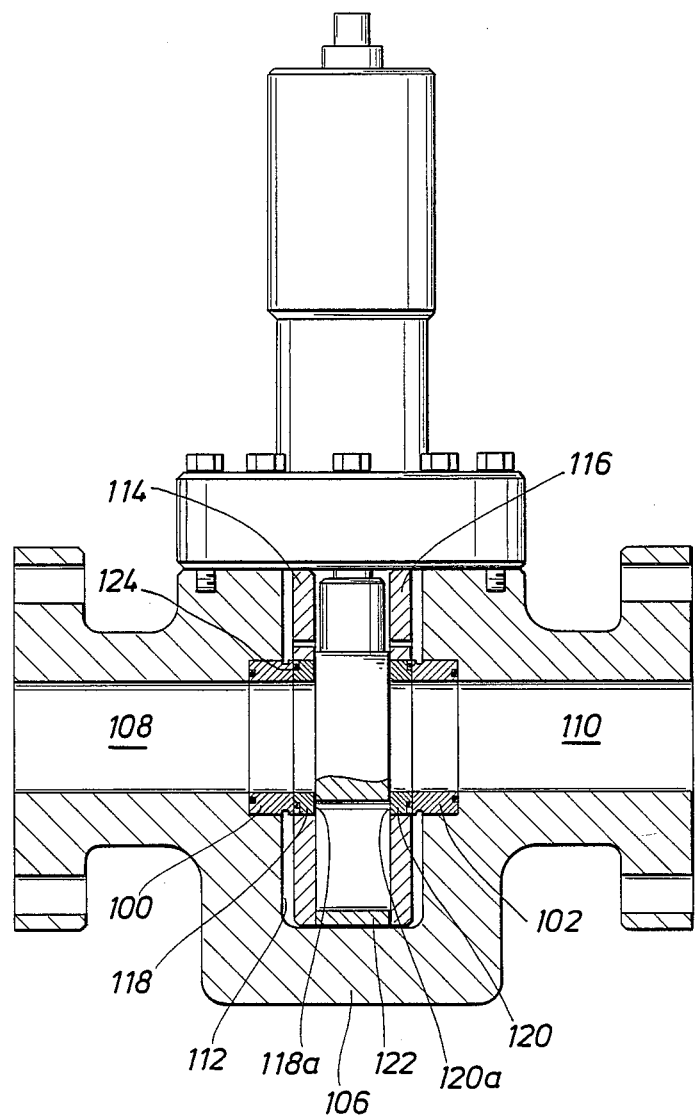
FIG. 1 is a side view, in section, of a gate valve apparatus having a valve seat ring assembly of the prior art.
Figure 3:
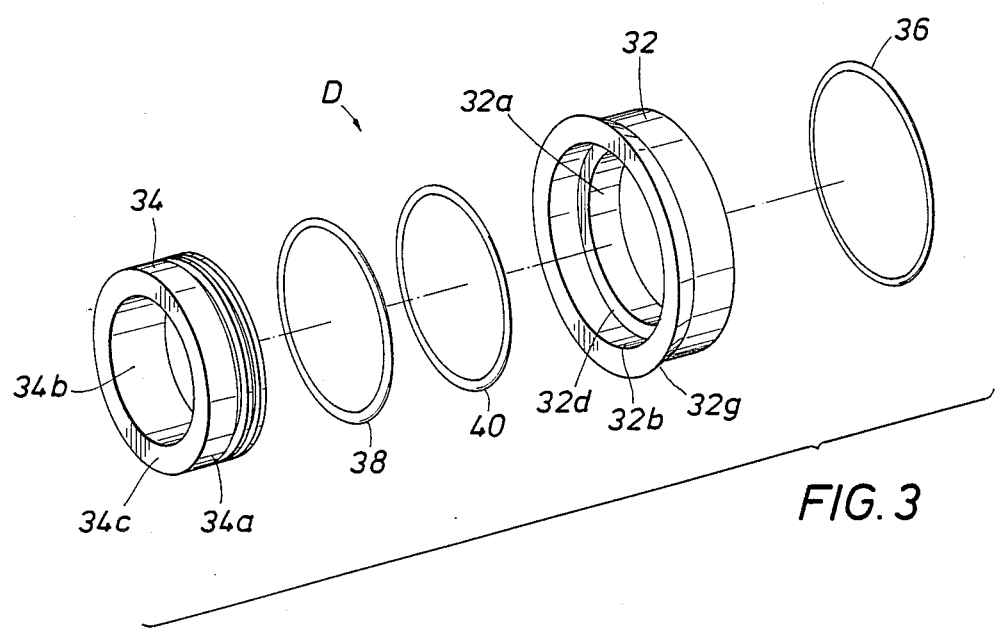
FIG. 3 is an isometric, exploded view, of the seat ring assembly of the present invention.

FIG. 1 illustrates a prior art through conduit gate type valve construction with a known valve seat assembly. The prior art valve seat assembly includes a first set of seat rings 100 and 102 mounted in seat pockets formed in the valve body 106 at the juncture of the flow passageways 108 and 110 and the valve chamber 112. The prior art seat assembly also includes seat support plate members 114 and 116 disposed on opposite sides of the reciprocating gate member 122 for operably positioning a second pair of seat rings 118 and 120. Each of the second seat rings form a face seal 118a and 120a for sealing with the reciprocating slide gate member 122. (Each of the second seat rings 118 and 120 carries a resilient sealing member 124 for sealing with the adjacent first seat rings 100 and 102, respectively.

While the prior art valve seal has performed satisfactory, it is expensive to manufacture, assemble and repair. Due to its complexity it was also subject to malfunctioning and could result in pressure lock of the ported gate member 122 in either the open or closed position.

Figure 2:
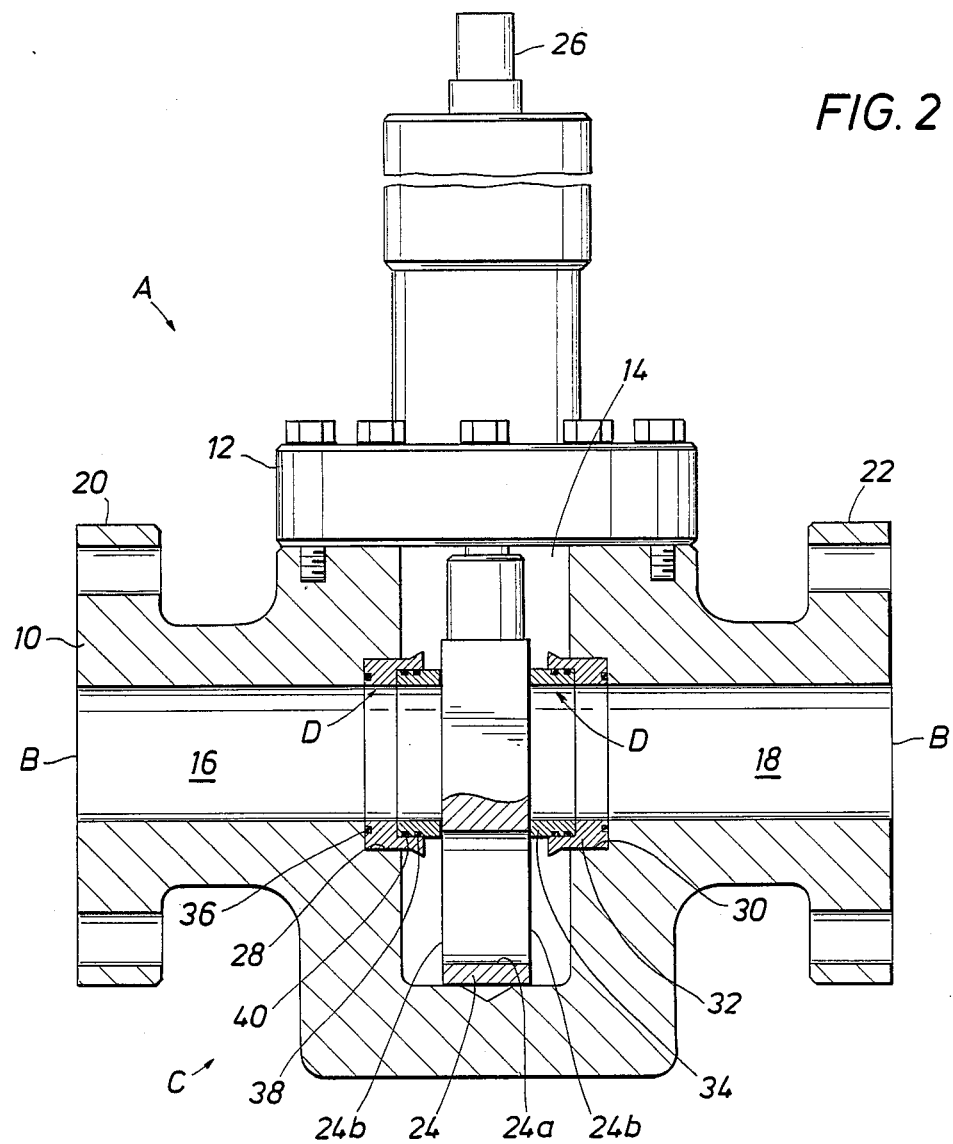
FIG. 2 is a side view, in section, of a gate valve apparatus having the valve seat ring assembly of the present invention.

The valve apparatus of the present invention generally designated A in the FIGS. is illustrated in FIG. 2. The valve apparatus A includes a conventional valve body 10 having a removable cap portion or valve bonnet 12 for providing desired access to a central internal valve chamber 14. The valve body forms flow passageways 16 and 18 which are preferably aligned or formed on a common longitudinal axis B—B to form a straight through flow path for the controlled fluid. Flanges 20 and 22 provide suitable means for operably mounting the valve apparatus A in a conventional flow conduit (not illustrated), but many other forms of known end connectors may be utilized for mounting with the well conduit as is well known to those skilled in the art.

Disposed in the cavity of chamber 14 is a movable gate member 24 having a flow port 24a formed therein and opposed polished sealing surfaces 24b. The gate member 24 is operably connected to a rotatable valve stem means 26 that extends through a sealed opening 12a in the bonnet. Rotation of the stem 26 from exteriorly of the valve body 10 reciprocates the gate member 24 upwardly from the closed position illustrated in FIG. 2 to an open position with the flow port 24a formed in the gate member 24 aligned with the flow passages 16 and 18 to provide the straight through flow path. Each of the flow passages 16 and 18 is provided with an enlarged seat pocket forming pockets 28 and 30, respectively at the junctures of the flow passages and the chamber 14.

A valve seat assembly means, generally designated C, seals between the valve body 12 and the gate member to control flow of fluid and prevent leakage of fluid therebetween. The valve seat assembly means C preferably includes a pair of valve seat assemblies D disposed on opposite sides of the gate member 24 to form upstream and downstream seat assemblies. The two valve seat assemblies are preferably identical in construction and interchangeable, but are oppositely facing in the seat pockets 28 and 30. For this reason, only one of the valve seat assemblies will be described in detail.

Figure 4:
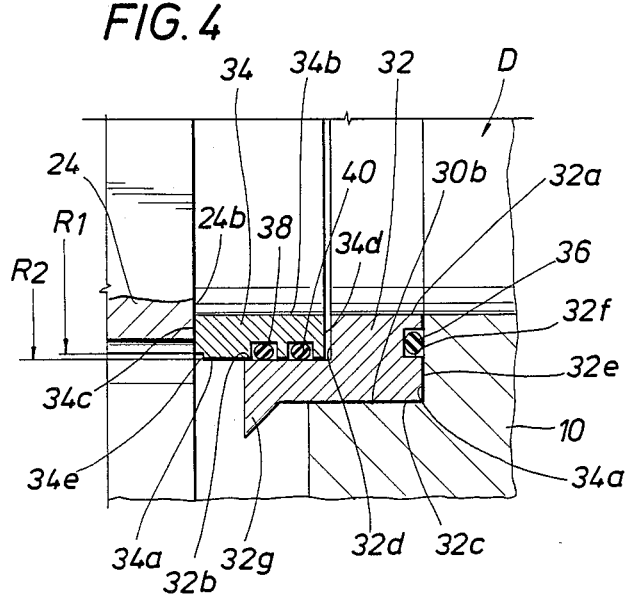
FIG. 4 is a schematic side view, of the seat ring assembly illustrating the pressure responsive operation.

As also illustrated in FIGS. 2 and 4, each of the valve seal assemblies D is formed of a first generally L-shaped seat ring or member 32 and a second seat ring or member 34 for fitting within pocket 30 defining a rear annular shoulder 30a and an outer peripheral surface 30b at right angles to shoulder 30a. The first seat or retainer ring 32 forms an inner peripheral or bore defining surface 32a therethrough of substantially the same diameter of the flow passages 16 and 18. The bore 32a is provided with an enlarged constant diameter portion 32b for receiving and concentrically mounting the second seat ring 34. The retainer ring 32 includes an outer peripheral surface 32c of substantially the same diameter as that of the seat pockets 28 and 30 so that the retainer ring 32 may be slidingly fitted in the seat pocket for securing with the valve body 10. An annular shoulder 32d connects the inner peripheral surface portions 32a and 32b of the seat ring 32.

Connecting the bore forming or smaller diameter portion 32a of the inner peripheral surface with the outer peripheral surface 32c is an annular end shoulder surface 32e. The annular shoulder 32e is preferably formed with an annular recess or groove 32f for carrying or mounting an O-ring 36. The O-ring 36 provides a means for sealing the retainer seat ring 32 with the valve body 10 for preventing leakage of fluid therebetween into the valve chamber 14 and for directing the flow of fluid through the bore 32a. The O-ring 36 also serves as a resilient or urging means for moving the valve seat assembly means toward and into sealing contact with the gate member 24. The outer peripheral surface 32c is formed with a suitable lip 32g for ease of extraction or removal of the retainer ring 32 from the seat pocket as desired.

The inner floating seal ring 34 is of a generally rectangular cross-section and forms an outer peripheral surface 34a of a slightly smaller diameter than the inner peripheral mounting surface 32b of the retainer ring 32 to enable relative sliding movement therebetween (both rotational and axially). The annular seat ring 34 forms an inner peripheral surface or bore defining surface 34b for providing a flow opening that is preferably of the same size or diameter as the flow passages 16 and 18. The inner and outer peripheral surface 34a and 34b are connected by annular shoulder surfaces 34c and 34d. The annular shoulder 34c is stepped or relieved at 34e so the polished or ground shoulder portion 34c will serve as a face seal for sealing with and engaging the polished sealing surfaces 24a of the reciprocating gate member 24b. By forming the relieved or recessed portion 34e the face seal with the gate 24 of the seat ring 34 cannot exceed the diameter or radius R1.

The annular shoulder 34d is preferably formed in a radial plane perpendicular to the center line or longitudinal axis B—B of the flow passages 16 and 18. When the seat rings 32 and 34 are assembled for operation the shoulder 34d engages the internal shoulder 32d of the retainer ring 32 for limiting further axial sliding movement of the seat ring 34 relative to the retainer ring 32. The geometry of the seat rings 32 and 34 is such that when the shoulders 32d and 34d are in engagement the face seal 34c of the seat ring 34 is only slightly spaced from the sealing face 24b of the gate 24. When the face seal 34c of the seat ring 34 is in sealing contact with the gate 24, the shoulders 32d and 34d are spaced apart a like distance. This provides a limited axial movement range of the seat ring 34 of only a few thousandths of an inch. Such spacing is preferably in the range of 0.0010 to 0.0015 of an inch in order that the urging of O-ring 36 will establish the seal between face seal surface 34c and the gate 24. Such spacing is greatly exaggerated in FIG. 4 for clarity of illustrating the relative radius or diameter of the various seals.

The outer peripheral surface 34a mounts a pair of O-rings 38 and 40 for effecting redundant seals between the seat members 32 and 34 at diameter or radius R2. Fluid pressure in the flow passageways 16 and 18 will act or urge on the shoulder 34d to urge the seat ring 34 toward and into sealing contact with the gate member 24. The effective pressure responsive area formed by shoulder 34d extends between the O-ring seals 38 and 40 (diameter R2) and the surface 34b. Since the outer diameter R1 of the face sealing shoulder surface 34c is smaller than diameter R2, the pressure responsive area provided by the surface 34c is smaller and the net resulting urging force on the seat ring 34 is away from the gate 22.

The shoulder surface 34e also provides a pressure response area that is responsive to fluid pressure in the chamber 14. This pressure responsive area is normally isolated from the fluid pressure in the flow passageway 16 and 18 by the face seal 34c with the gate 24. In the event fluid pressure in the chamber 14 exceeds the pressure in the flow passages 16 and 18, the urging on surface 34e will tend to automatically shift the seat ring 34 away from the gate 34 and thereby venting the pressure buildup from the chamber 14 to preclude occurrences of the pressure lock condition. As the fluid pressure in the chamber 14 escapes, the urging of the fluid pressure at shoulder 34d and O-ring 36 will reestablish the face seal 34c with the gate 24.

Figure 5:
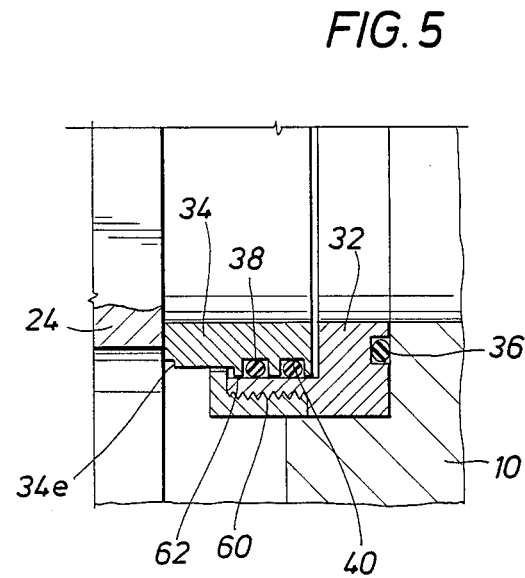
FIG. 5 is a view similar to FIG. 4, illustrating a modified form of the valve seat ring assembly of the present invention.

A modified embodiment of the valve seal assembly is illustrated in FIG. 5, that limits the axial movement of the seat ring 34 in both directions relative to the retainer ring 32. In this embodiment, the retainer ring 32 is formed of two parts that are threadedly secured together at 60. The retainer ring 32 is formed with an annular shoulder 62 that engages a stepped portion of the face seal for limiting axial movement of the seat ring 34 toward the gate member 24. Such arrangement is desirable for assembly purposes as the presence of the gate member 24 prevents separation of the seat ring 34 from the retainer ring 32 of the valve assembly in either embodiment.

USE AND OPERATION

In the use and operation of the present invention, the retainer rings 32 are fitted into the seat pockets 28 and 30 in order that O-ring 36 will effect the desired seal with the valve body 10. The seat rings 34 are then positioned in the manner illustrated and the gate member 24 installed. The gate 24 and stem 26 are operably connected and the bonnet 12 secured to the valve body 10. The valve apparatus A is now assembled and may be installed in the flow conduit using flanges 20 and 22 when desired.

Fluid pressure introduced in the flow passageways 16 and 18 along with O-ring 36 will energize the seat ring 34 to insure movement toward the gate member 24 for effecting the face seal between the gate member 24 and the sealing shoulder 34c of the seat ring 34. Such sealing contact is maintained when the gate member 24 is reciprocated to either the open or closed positions.

In the event of fluid pressure leakage into the valve chamber 14, the chamber pressure will urge on the pressure responsive surface 34e formed between the outer limit of the face seal 34c and the O-rings 38 and 40 of the seat ring 34 for slightly spacing the face seal surface 34c from the gate member 24. This spacing vents the fluid pressure in the valve chamber 14 back into the flow passages 16 and 18 for automatically relieving or venting the chamber pressure to prevent occurrence of pressure lock of the gate 24.

Due to the flow restriction and reduced fluid pressure across face seal 34c provided by the slight venting clearance between the seat ring 34 and the gate 24, fluid pressure in the flow passages 16 and 18 along with O-ring 36 will urge on pressure responsive shoulder 34d to shift the seat ring 34 axially to reestablish the face seal with the gate 24.

In the event of a malfunction or damage to the seat assembly, it is only necessary to disassembly the bonnet portion 12 from the valve body 10 to gain access to the valve chamber 14. The gate member 24 can then be easily removed to provide access to the seat 34 and retainer rings 32. These parts can then be easily removed for cleaning and inspection. Reassembly is then accomplished in the manner perviously described using either undamaged original or replacement parts. Such disassembly, inspection, repair and reassembly can be easily accomplished without removing the valve from the flow line.

The foregoing disclosure and description of the invention are illustrative and explanatory thereof, and various changes in the size, shape and materials, as well as in the details of the illustrated construction, may be made without departing from the spirit of the invention.

What is claimed is:

1. In a through conduit gate valve structure having a valve body defining a valve chamber and inlet and outlet flow passages communicating with the valve chamber, a gate valve member having a port therein mounted within the valve chamber for reciprocal movement between open and closed positions relative to said flow passages, and an annular body pocket at the juncture of each flow passage with the valve chamber with each pocket defining a rear annular shoulder and an outer peripheral surface at right angles to said rear shoulder;

an improved seat assembly mounted in each of said body pockets to provide upstream and downstream seat assemblies; each improved seat assembly comprising:

an outer generally L-shaped seat retaining ring positioned within an associated body pocket in opposed contacting relation to said rear annular shoulder and outer peripheral surface of said body pocket;

said L-shaped retaining ring having an annular shoulder and outer peripheral surface to form a seat pocket therein;

an inner floating seat ring fitting within the seat pocket of said L-shaped outer retaining ring adjacent said annular shoulder and outer peripheral surface thereof, said outer L-shaped seat retaining ring and said inner floating seat ring having annular inner peripheral surfaces of the same diameter as said flow passages and forming a smooth continuation thereof;

said L-shaped retaining ring having a rear face positioned in metal-to-metal contact relation with said annular shoulder of said body pocket and an annular groove in said rear face;

a first O-ring received in said annular groove and maintaining sealing relation between said rear face and said annular shoulder of said body pocket under all conditions of operation of said gate valve structure and blocking fluid flow between the body pocket and retaining ring;

said inner floating seat ring being of a generally rectangular cross-section having a front face engaging the gate valve member in sealing relation, a rear face adjacent the annular shoulder of the seat pocket of said L-shaped retaining ring, and an outer peripheral surface with an annular groove therein;

a second O-ring received within the annular groove of said floating seat ring for sealing between the outer peripheral surface of said seat ring and said outer peripheral surface of the seat pocket of said seat retaining ring;

said floating seat ring upon fluid pressure in the adjacent flow passage exceeding the body chamber fluid pressure a predetermined amount moving in a direction toward the gate valve member relative to said L-shaped seat retaining ring for maintaining a tight sealing relation with said gate valve member, said floating seat ring upon fluid pressure in said valve body chamber exceeding the adjacent flow passage pressure a predetermined amount moving out of sealing contact with said gate valve member to permit leakage of fluid from the body chamber into the adjacent flow passage;

the maximum axial spacing between said floating seat ring and said retaining ring being less than the expanded diameter of said first O-ring between the opposed shoulders of said retaining ring and said body pocket thereby to maintain sealing relation between said retaining ring and said body pocket under all conditions of operation for blocking flow of lading from the adjacent flow passage to the outer peripheral surface of said body pocket and the outer peripheral surface of said seat retaining ring.

2. In a through conduit gate valve structure as set forth in claim 1;

said upstream seat assembly being the primary sealing member and utilizing said first and second O-rings to provide sealing.

3. In a through conduit gate valve structure as set forth in claim 2;

said outer peripheral surface of said floating seat ring having a pair of spaced annular grooves therein; and an O-ring positioned within each of said annular grooves for sealing between the outer peripheral surface of said seat ring and the outer peripheral surface of said seat pocket of said seat retaining ring.

* * * * *

UNITED STATES PATENT AND TRADEMARK OFFICE
CERTIFICATE OF CORRECTION

PATENT NO. : 4,878,651
DATED : November 7, 1989
INVENTOR(S) : Frank W. Meyer, Jr.

It is certified that error appears in the above-identified patent and that said Letters Patent is hereby corrected as shown below:

Column 3, line 41, after "forms" cancel "an" and insert -- a small diameter --.

Column 3, line 44, after "diameter" insert -- inner peripheral surface or --.

Column 4, line 3, before "inner" insert -- large diameter --.

Column 4, line 10, cancel "surface" and insert -- surfaces --.

Column 4, line 54, change numeral "22" to -- 24 --.

Column 4, line 63, change numeral "34" to -- 24 --.

Claim 1, line 21, change "outer" to -- inner --.

Claim 1, line 25, change "outer" to -- inner --.

Claim 3, line 8, change "outer" to -- inner --.

Signed and Sealed this

Seventh Day of September, 1993

Attest:

BRUCE LEHMAN

*Attesting Officer*   Commissioner of Patents and Trademarks